US012810077B2

(12) United States Patent
Rose et al.

(10) Patent No.: US 12,810,077 B2
(45) Date of Patent: Nov. 24, 2026

(54) SYSTEMS AND METHODS FOR TRAINING LANGUAGE MODELS TO PERFORM ACTION CHAINS

(71) Applicant: Zeta Global Corp., New York, NY (US)

(72) Inventors: David Rose, Atlanta, GA (US); Zachary Jones, Decatur, GA (US); Danny Portman, Johns Creek, GA (US); Rohit Surve, San Francisco, CA (US); Roman Gun, New York, NY (US)

( * ) Notice: Subject to any disclaimer, the term of this patent is extended or adjusted under 35 U.S.C. 154(b) by 56 days.

(21) Appl. No.: 18/662,960

(22) Filed: May 13, 2024

(65) Prior Publication Data

US 2024/0378389 A1 Nov. 14, 2024

Related U.S. Application Data

(60) Provisional application No. 63/466,195, filed on May 12, 2023.

(51) Int. Cl.
*G06F 40/30* (2020.01)

(52) U.S. Cl.
CPC .................................... *G06F 40/30* (2020.01)

(58) Field of Classification Search
CPC ...................................................... G06F 40/30
See application file for complete search history.

(56) References Cited

U.S. PATENT DOCUMENTS

| | | | | |
|---|---|---|---|---|
| 12,216,713 | B1 * | 2/2025 | Shapira | G06F 16/90332 |
| 2007/0136262 | A1 * | 6/2007 | Dettinger | G06F 16/28 |
| 2021/0241038 | A1 * | 8/2021 | Alvarez | G06F 18/2148 |
| 2023/0306061 | A1 * | 9/2023 | Bui | G06F 16/9032 |
| 2023/0342167 | A1 * | 10/2023 | Radkoff | G06F 16/957 |
| 2023/0342670 | A1 * | 10/2023 | Leary | G06F 16/953 |

* cited by examiner

*Primary Examiner* — Sonia L Gay
(74) *Attorney, Agent, or Firm* — Schwegman Lundberg & Woessner, P.A.

(57) ABSTRACT

The subject technology uses an agent architecture for language models and large language models (LMs) to complete a variety of different tasks within software platforms. The agent LMs are trained to determine different action chains that may be used to generate responses to tasks requested by users. The action chains may include a sequence of multiple actions that each complete a portion of the requested task. The agent LMs may be trained to perform different types of action chains using training prompts that teach the agent LMs to use tools that enable the LMs to interact with different software resources. The agent architecture may coordinate multiple agent LMs to complete tasks that require multiple action chains to complete.

20 Claims, 10 Drawing Sheets

640A

Training Instructions 642A

Agent Instructions (e.g., "You are a large language model called Omnisearch. Omnisearch is designed to be able to assist with a range of tasks such as:

<model_task_A>: (e.g., gathering insights from data)

●●●

<model_task_N>)

Resource Instructions (e.g., Here are the instructions for working with <resource_A> given an input question return the answer from resource_A summarizing or interpreting the answer if needed).....

<input_data_format>:(e.g., a natural language text)

<resource_task>: (e.g., create a syntactically correct <dialect> query to run, then look at the results of the query and return the answer.)

<task_parameters>: (e.g., use tools below to interact with resource, limit your query to <top_k> results, never query all column tables, etc.)

<output_format>: (e.g., summarize results, order results by a relevant column, etc.)

<validation_instructions>: (e.g., double check query before executing, rewrite query if you get an error, do not make any DML statements)

Tools 644A

<tool_A_name>: (e.g., query_sql_db)

<tool_A_description>: (e.g., An sql shell. Use this to execute sql queries. Input should be a valid sql query)

<tool_A_parameters>: (e.g., tool input format (e.g., sql dialect query), required inputs (e.g, a valid sql query), tool output format (e.g., comma separated values), tool optimizations (e.g., input character limit)

●●●

<tool_N_name>
<tool_N_description>
<tool_N_parameters>

Query Data 520

<user_request_A>: (e.g., Which of my campaigns has the most clicks in the past month?)

Chain History 646A

Entering new <Trained_LLM_A> (e.g., OmnisearchAgent) chain...

<Action_A >:(e.g., use tool RelevantTableRetrievalQA to determine relevant tables)

<Prompt_A >:(e.g., which tables contain information about campaigns and clicks?)

<Completion_A>: (e.g, impressions, conversions)

<Action_B>:(e.g., use tool TableSchemaLookup to determine schema for relevant tables)

<Prompt_B>: (e.g., impressions, conversions)

<Completion_B>: (e.g., creation statements for impressions and conversions tables)

<Action_C>:(e.g., use tool query_sql_db to extract relevant data from tables)

<Prompt _C>: ((e..g., SELECT bsin, COUNT(*) as click_count FROM conversions WHERE event_type = 'conversion' AND date >= DATEADD(month, -1, CURRENT_DATE) GROUP BY bsin ORDER BY click_count DESC LIMIT 1)

<Completion_C>: [('campaign_id', 16)]

FIG. 8

SYSTEMS AND METHODS FOR TRAINING LANGUAGE MODELS TO PERFORM ACTION CHAINS

PRIORITY CLAIM

This patent application claims the benefit of priority, under 35 U.S.C. Section 119 (e), to Rose et al, U.S. Provisional Patent Application Ser. No. 63/466,195, entitled "ARTIFICIAL INTELLIGENCE SYSTEM FOR PERFORMING ACTION CHAINS," filed on May 12, 2023, which is hereby incorporated by reference in its entirety.

TECHNICAL FIELD

The subject matter disclosed herein generally relates to the technical field of machine learning used in a network-based computing environment. In particular, the disclosure recites improved training techniques for language models configured to perform actions.

BACKGROUND

The present subject matter seeks to address technical problems existing in training language models to function as agents that perform actions and multistep tasks.

BRIEF DESCRIPTION OF THE DRAWINGS

Some embodiments are illustrated by way of example and not limitation in the figures of the accompanying drawings.

FIG. 8 illustrates more details of a training prompt, according to various embodiments described herein.

DETAILED DESCRIPTION

Figure 1:
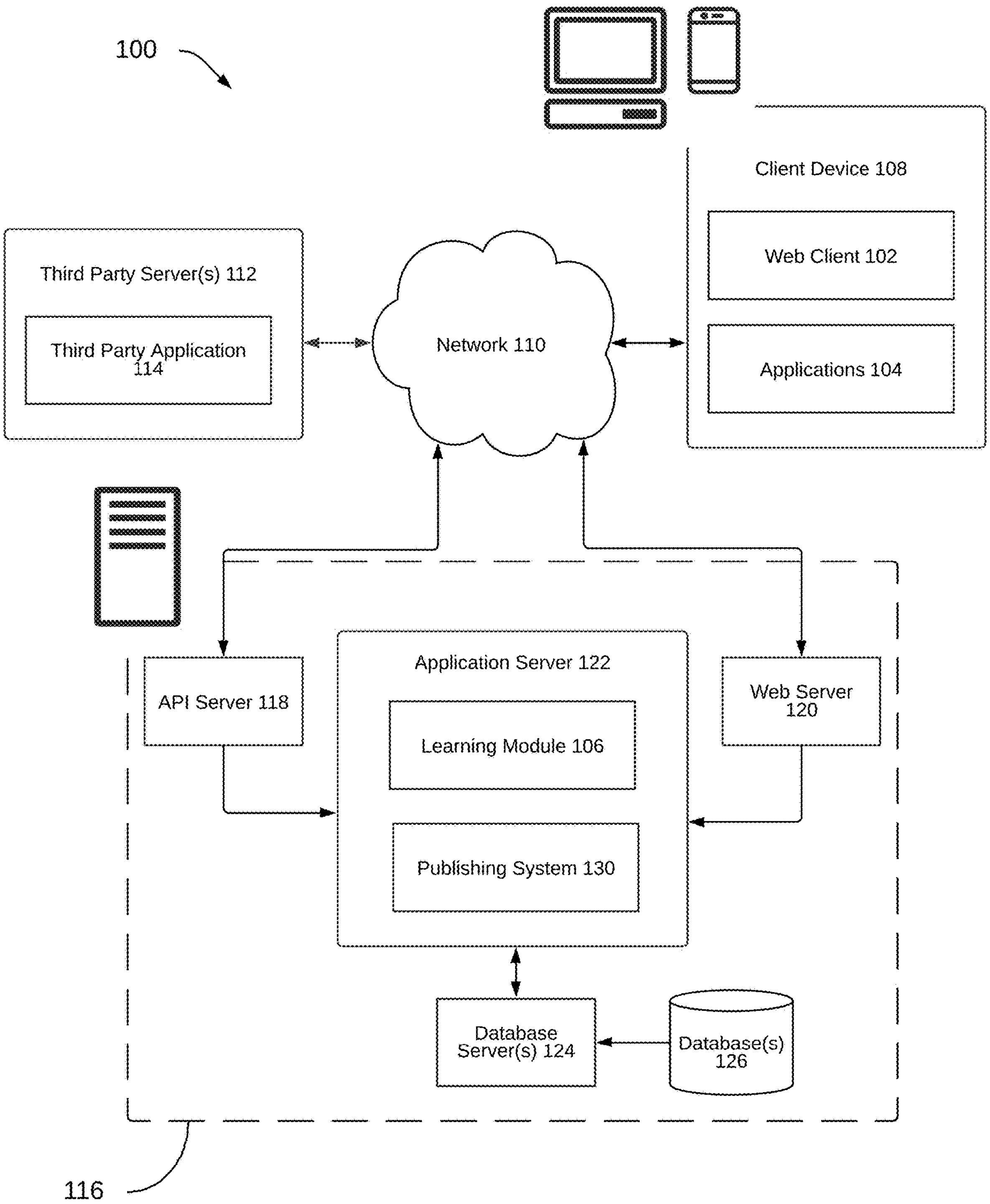
FIG. 1 is a block diagram illustrating a high-level network architecture, according to various embodiments described herein.

The description that follows includes systems, methods, techniques, instruction sequences, and computing machine program products that embody illustrative embodiments of the disclosure. In the following description, for the purposes of explanation, numerous specific details are set forth to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The embodiments discussed herein involve or relate to artificial intelligence (AI). AI may involve perceiving, synthesizing, inferring, predicting and/or generating information using computerized tools and techniques (e.g., machine learning). For example, AI systems may use a combination of hardware and software as a foundation for rapidly performing complex operations to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input data (e.g., training data), which allows the model improve its abilities. For example, a dataset may be input to a model, which may produce an output based on the dataset and the configuration of the model itself. Then, based on additional information (e.g., an additional input dataset, validation data, reference data, feedback data), the model may deduce and automatically electronically implement a change to its configuration that will lead to an improved output.

Powerful combinations of model parameters and sufficiently large datasets, together with high-processing-capability hardware, can produce sophisticated models. These models enable AI systems to interpret incredible amounts of information, which would otherwise be impractical, if not impossible, for the human mind to accomplish. The results, including the results of the embodiments discussed herein, are astounding across a variety of applications. For example, an AI system can be configured to autonomously operate computers, vehicles and other machines, automatically recognize objects, instantly generate natural language, recognize patterns in large datasets, understand human speech, and generate artistic images.

Language models including large language models (LMs) of various capabilities, described herein, may be used to improve the versatility and robustness of Application Programming Interfaces (APIs) and applications (e.g., agentic applications) to perform a multitude of tasks. Training on specific instructions, tools, and thought chains, may extend the functionality of LMs beyond understanding and generating natural language or code to encompass performing actions. The training techniques described below may enable the LMs to access and operate one or more software components (e.g., database, API, software package, and the like) required to perform an action. The trained LMs may chain two or more actions together to execute complex workflows for completing multistep tasks. For example, the trained LMs may create content libraries for specific brand personas, build and deploy content publishing campaigns across one or more publishing channels, generate creative assets to target specific audience segments, construct charts and other data visualizes displaying trends one or more performance metrics, troubleshoot errors, and the like. The trained LMs may also be configured to optimize in progress media campaigns by, for example, re-allocating channel budgets, varying the content mix, adjusting target audience segments, and the like based on feedback data to boost one or more target key performance indicators (KPIs), measuring engagement, reach, sales, and the like.

An actions engine may train and use the trained LMs to perform actions and action chains. The actions engine may be implemented within a learning module included in the SaaS network architecture described in FIG. 1 below so that the functionality of the trained LMs may be scaled to operate in multiple instances of a software applications and across multiple software platforms. The SaaS network architecture may deliver the functionality of the trained LMs to multiple users simultaneously so that the LMs may execute multiple distinct actions chains at the same time. The LM training techniques improve the functionality and versatility of AI systems by extending the functionality of LMs beyond natural language processing to encompass autonomous tasks that require operating software components. The actions engine may improve the versatility, speed, efficiency, and reliability of software applications by reducing the number of manual programming tasks and API endpoints required to access and operate platform functionality. The technology further improves the availability and interoperability of software applications and enhances user experience by exposing a multitude of software components using a simplified access endpoint. The actions engine provides a simple natural language interface that enables users to readily interact with software components that were previously inaccessible because the components were reachable only through a technical interface (e.g., an API). Users may use the actions engine to operate software components in new, more customizable ways to accomplish specific tasks that would have previously taken much longer to complete and would be impossible to perform without advanced technical knowledge.

With reference to FIG. 1, an example embodiment of a high-level SaaS network architecture 100 is shown. A networked system 116 provides server-side functionality via a network 110 (e.g., the Internet or WAN) to a client device 108. A web client 102 and a programmatic client, in the example form of a client application 104, are hosted and executed on the client device 108. The networked system 116 includes an application server 122, which in turn hosts a publishing system 130 (such as a demand side platform (DSP), message transfer agent (MTA), and the like) that provides a number of functions and services to the client application 104 that accesses the networked system 116. The client application 104 also provides a number of graphical user interfaces (GUIs) described herein that may be displayed on one or more client devices 108 and may receive inputs thereto to configure an instance of the client application 104 and monitor operations performed by the application server 112. For example, the client application 104 may provide configuration UIs for selecting content creatives, audience segments, budget allocations, publishing channels, and other configuration settings for one or more content campaigns. The client application 104 may also provide natural language UIs for creating LM prompts that may be submitted to the actions engine. The UIs can present outputs to a user of the client device 108 and receive inputs thereto in accordance with the methods described herein.

The client device 108 enables a user to access and interact with the networked system 116 and, ultimately, the learning module 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the learning module 106, which includes components or applications described further below. The application server 122 may also host a publishing system 130 that distributes content on one or more channels including email, web display, mobile display, social media, linear tv, streaming, and the like. The application server 122 is, in turn, shown to be coupled to a database server 124 that facilitates access to information storage repositories (e.g., a database 126). In an example embodiment, the database 126 includes storage devices that store information accessed and generated by the learning module 106.

The publishing system 130 may be a demand side platform (DSP), email service provider (ESP), or other system that distributes content digitally over a network. For example, the publishing system may be a DSP that includes an integrated bidding exchange, an online demand side portal accessible to a targeted content provider, and an online supply side portal accessible to a publisher of content on the publication network 110. The bidding exchange may be communicatively coupled to the demand side portal and the supply side portal to present user interfaces enabling receipt of bids from a brand or other media provider for placement of content and other media by a publisher at a specified location or domain in available inventory on the publication network 110. In some examples, the publication system 130 may be configured to present media to a consumer at a specified location or domain on the publication network based on one or more predictions generated by an LM or AI system implemented in the learning module 106. For example, a bidding agent LM included in the learning module 106 may determine an amount for an optimal bid for a placement. The demand side portal may, upon receiving a signal from the media provider that the optimal bid is successful (i.e., the highest bid for the placement), reserve the placement at the specified location or domain. The demand side portal may then publish the piece of media at the reserved placement. Users accessing the locations including the reserved placements may view and engage with the media. In some examples, the publishing system 130 is further configured to process a transaction between the media provider and the publisher based on the presentation or a viewing of the targeted media by the consumer, or a third party. Accordingly, the publishing system 130 and learning module 106 may work in concert to enable scalable digital media campaigns that publish target content to an audience segment on one or more channels.

The learning module 106 may also include and/or one or more LMs that perform actions and/or chain actions to access and operate functionality of the publishing system 130 and other components of the application server 122. For example, one or more configurations to a LM may monitor and report engagement KPIs for the reserved placements mentioned above. The LMs may also build creative assets that are published by the publishing system 130 and/or build media campaigns that are deployed to the publishing system 130.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions of an AI system, website, streaming platform hosted by a third party.

Turning now specifically to the applications hosted by the client device 108, the web client 102 may access the various systems (e.g., the learning module 106) via the web interface supported by the web server 120. Similarly, client application 104 (e.g., a digital marketing "app") accesses the various services and functions provided by the learning module 106 via the programmatic interface provided by the API server 118. Client application 104 may be, for example, an "app" executing on the client device 108, such as an iOS or Android OS application, to enable a user to access and input data on the networked system 116 in an offline manner and to perform batch-mode communications between the client application 104 and the networked system 116. Client application 104 may also be a web application or other software application executing on the client device 108.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The learning module 106 could also be implemented as a standalone software program, which does not necessarily have networking capabilities.

Figure 2:
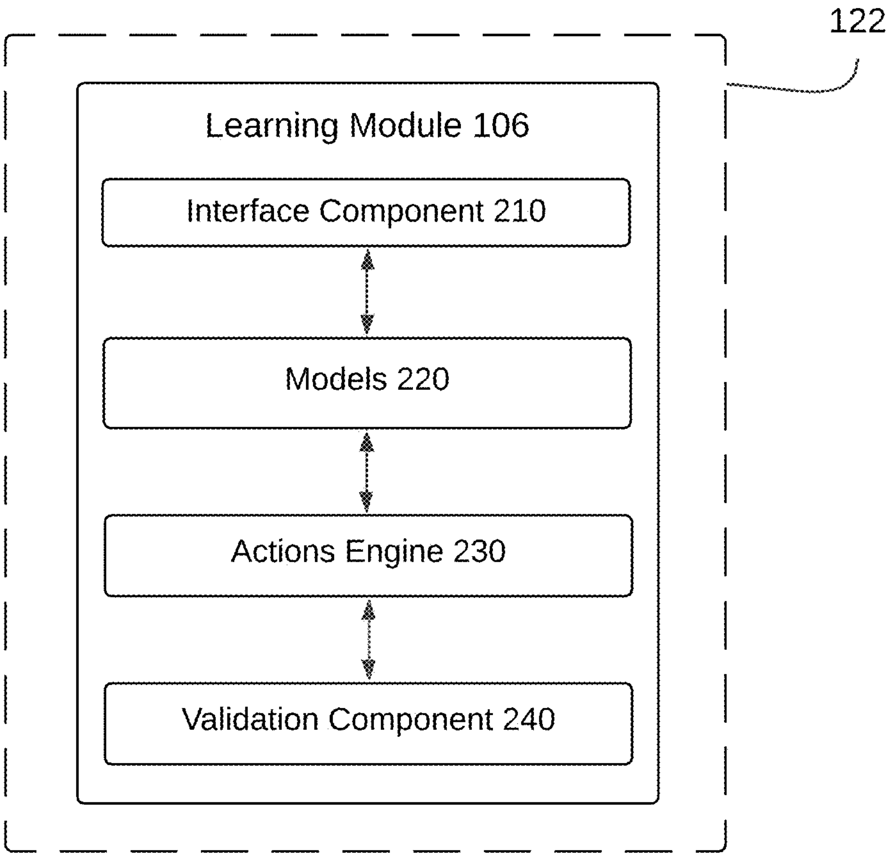
FIG. 2 is a block diagram showing architectural aspects of a learning module, according to various embodiments described herein.

FIG. 2 is a block diagram showing architectural details of a learning module 106, according to some example embodiments. Specifically, learning module 106 is shown to include an interface component 210 by which the learning module 106 communicates (e.g., over a network 110) with other systems within the SaaS network architecture 100.

The interface component 210 is collectively coupled to one or more models 220 that operate to optimize, build, and/or execute content campaigns run on the publishing system 130. The models 220 may include linear regression models, decision trees, neural networks, LMs, and other machine learning and/or artificial intelligence models. An actions engine 230 coupled to the models 220 implements a training approach that trains LMs to perform a multitude of actions. The operations of the actions engine 230 are covered in detail below with reference to the accompanying drawings. A validation component 240 connected to the actions engine 230 reviews the actions performed by the trained LMs to ensure the LMs are performing as trained and not acting in ways that are undesirable by the user or may damage or restrict one or more components of the software platform. Outputs generated by the trained LMs may be provided to the interface component 210 for display in one or UIs of the publishing system 130.

Figure 3:
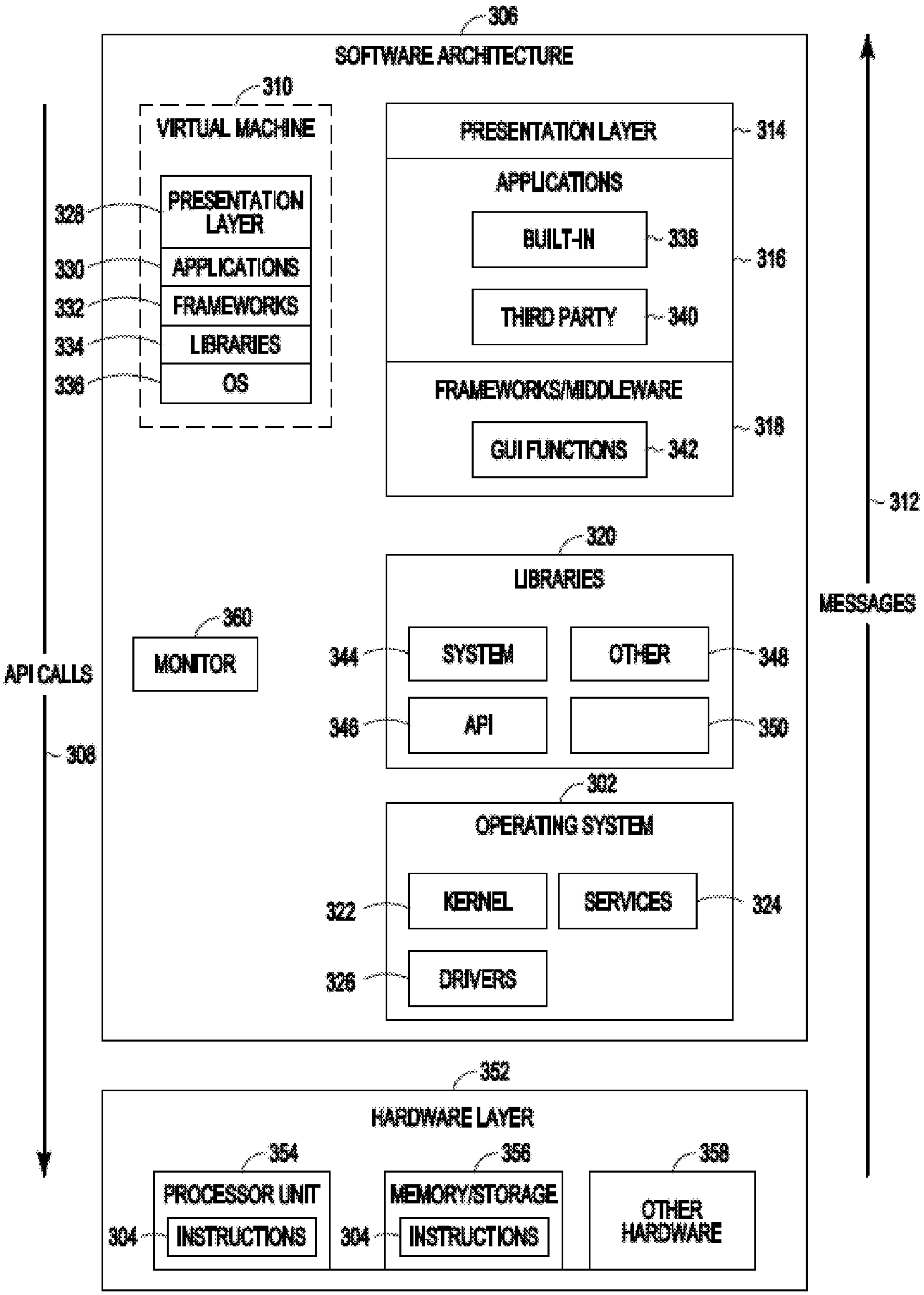
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, a publishing application, a content application, a campaign configuration application, performance monitoring application, a scoring application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executed within the virtual machine 310 can be the same as corresponding layers previously described or may be different.

Figure 4:
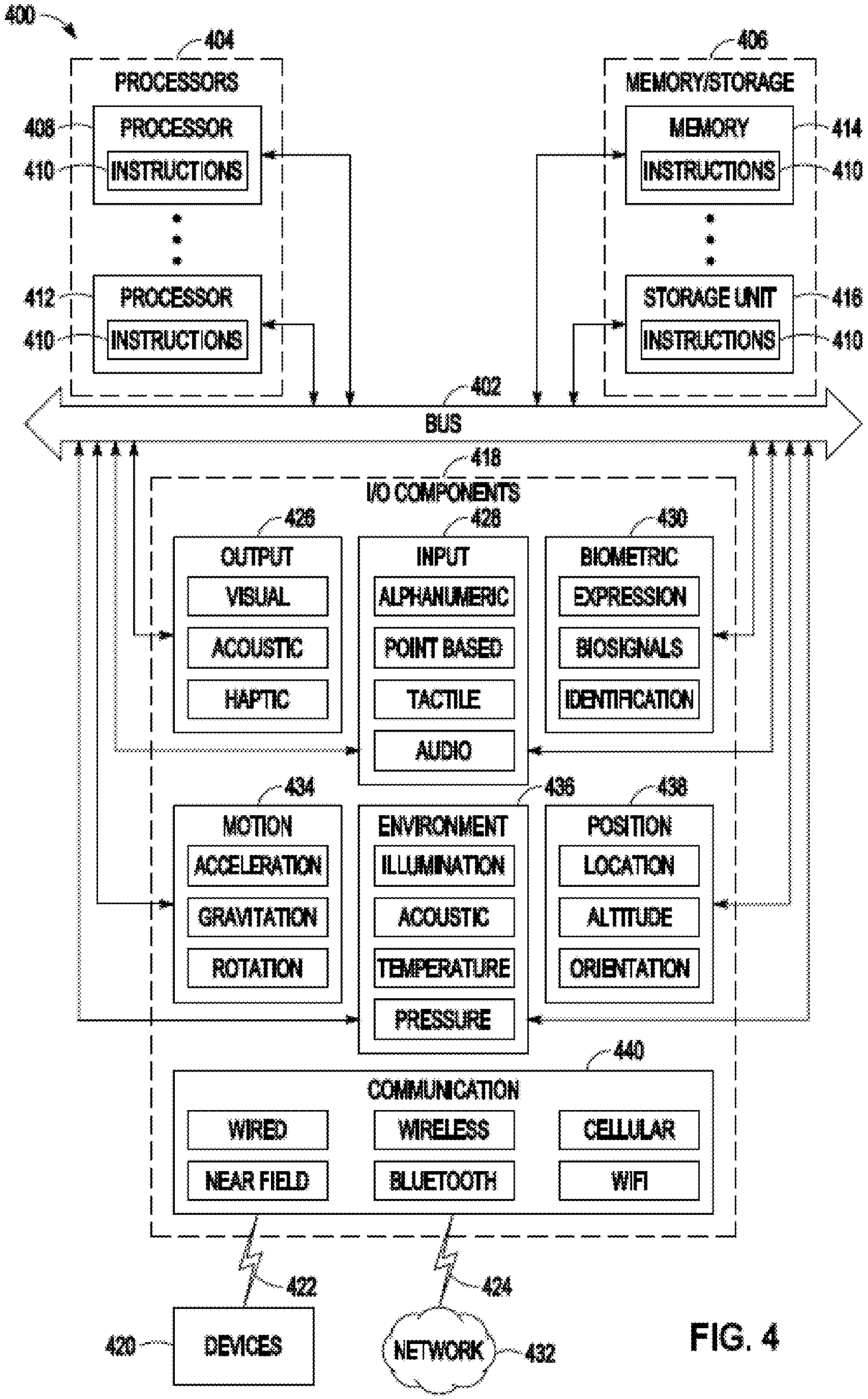
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a non-transitory machine-readable medium (e.g., a non-transitory machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

Figure 5:
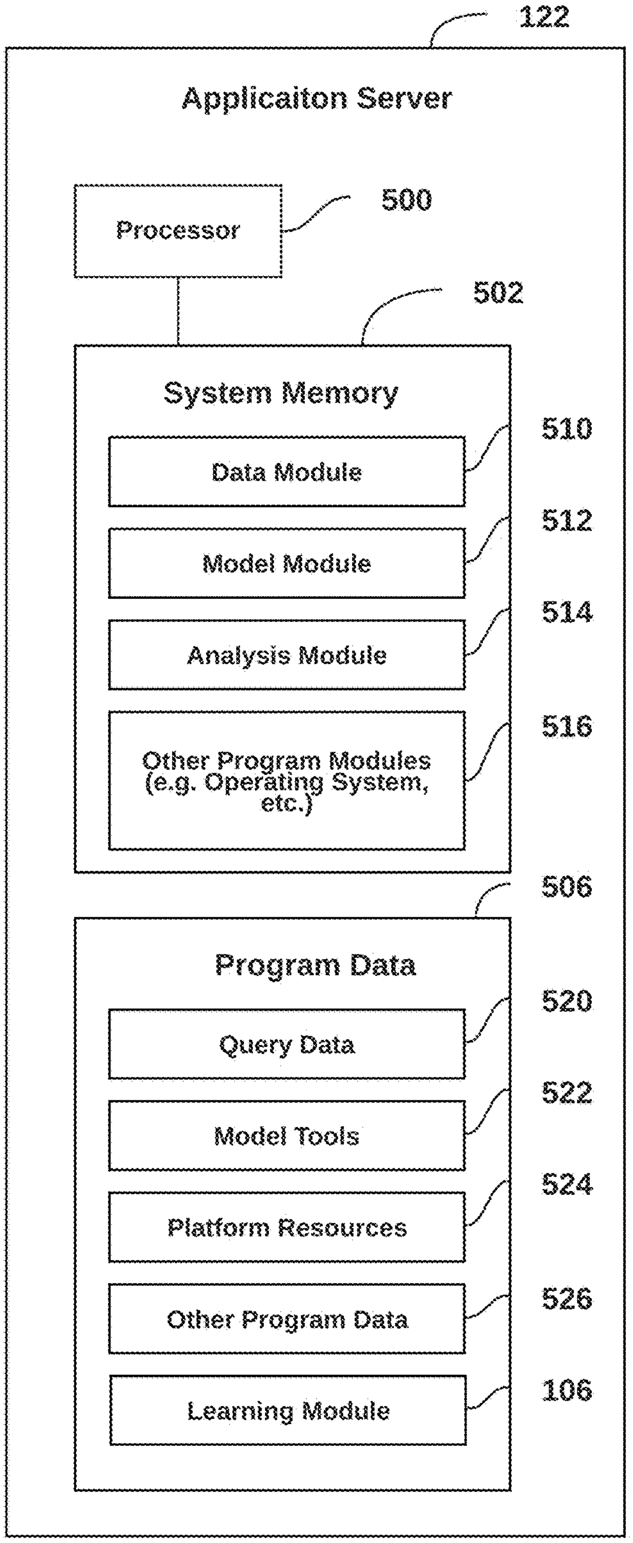
FIG. 5 depicts aspects of an implementation of one or more components of an application server, according to various embodiments described herein.

With reference to FIG. 5, an application server 122 hosting a learning module may include at least one processor 502 coupled to a system memory 504. The system memory 504 may include computer program modules 506 and program data 508. In this implementation, program modules 506 may include a data module 510, a model module 512, an analysis module 514, and other program modules 516 such as an operating system, device drivers, and so forth. Each module 510 through 516 may include a respective set of computer-program instructions executable by one or more processors 502.

This is one example of a set of program modules, and other numbers and arrangements of program modules are contemplated as a function of the particular design and/or architecture of the content engine. Additionally, although shown as a single application server, the operations associated with respective computer-program instructions in the program modules 506 could be distributed across multiple computing devices. Program data 508 may include request data 520, model tools 522, and resources 524, and other program data 526 such as data input(s), third-party data, and/or others. In some examples, instructions providing the operations and functionality of the learning module 106 may also be stored in program data 506.

In various embodiments, request data 520 may include natural language inputs received from users. Model tools 522 may include functions that LMs may use to interact with the world. Each of the model tools 522 may include multiple lines of computer code, API endpoints, arranged to receive one or more lines of text as input and generate one or more lines of text as output. Resources 524 may include data sources 622, software packages 624, content libraries 626, models 220, and other objects that the LMs may interact with using the model tools 522. One or more resources 524 may be stored in program data 506. The resources 524 may also include an interface or instructions for interacting with one or more objects that are not stored in program data 506.

One or more pieces of request data 520, model tools 522, and/or resources 524 may be included in baseline prompts used to train one or more large language models. The actions engine 230 may assemble the baseline prompts and train the LMs using the prompts. The actions engine 230 may also operate the trained LMs to perform one or more requested actions.

Figure 6:
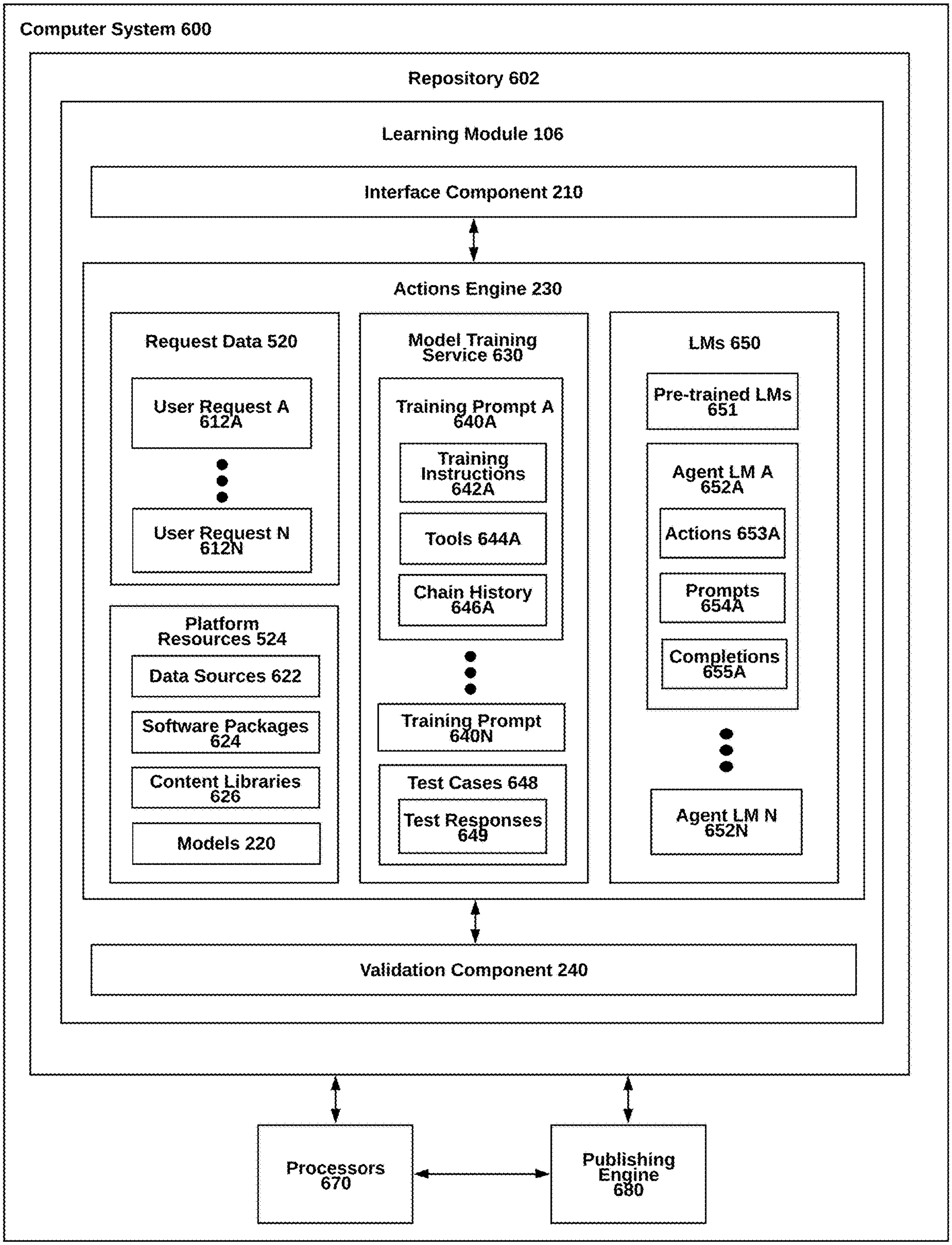
FIG. 6 depicts aspects of an actions engine, according to various embodiments described herein.

FIG. 6 is a block diagram illustrating more details of the learning module 106 in accordance with one or more embodiments of the disclosure. The learning module 106 may be implemented using a computer system 600. In various embodiments, the computer system 600 may include a repository 602, a publishing engine 680, and one or more computer processors 670. In one or more embodiments, the computer system 600 takes the form of the application server 122 described above in FIG. 1 or takes the form of any other computer device including a processor and memory. In one or more embodiments, the computer processor(s) 670 takes the form of the processor 500 described in FIG. 5.

In one or more embodiments, the repository 602 may be any type of storage unit and/or device (e.g., a file system, database, collection of tables, or any other storage mechanism) for storing data. Further, the repository 602 may include multiple different storage units and/or devices. The multiple different storage units and/or devices may or may not be of the same type or located at the same physical site. The repository 602 may include a learning module 106 that may comprise an interface component 210, an actions engine 230, and validation component 240. The actions engine 230 may train LMs 650 to perform actions and generate responses to user requests received by the interface component 210. The interface component 210 may also transmit outputs generated by actions performed by the LMs 650 to one or more UIs of the publishing system, client devices, or other components of the SaaS network architecture. The learning module 106 may also include a validation component 240 that evaluates the outputs to the LMs to provide feedback data that may be used to train the trained LMs 652A, . . . , 652N. Each trained LM 652A may generate responses to actions 653A by receiving prompts 654A and generating completions 655A in response to the prompts 654A. The validation component 240 may also review the outputs of the LMs 650 for errors, anomalies, and/or other abnormalities to ensure the LMs 650 is performing as desired.

The actions engine 230 may receive request data 520 from a client device. Request data 520 may include one or more natural language user queries 612A, . . . , 612N that may be entered into a UI having a text box or other component that receives natural language inputs. User queries 612A, . . . , 612N may include one or more lines of natural language text that may be entered into a UI (e.g., a search UI, actions UI, and the like) displayed on a client device and used to operate a software application hosted by the application server (e.g., a publishing system). The user queries 612A, . . . , 612N may include one or more requests (e.g., questions a user would like answered, commands to perform one or more tasks for the user, and the like). The model training service 630 may parse the user queries 612A, . . . , 612N using one or more pre-trained LMs 651 (e.g., one or more general purpose LMs trained to perform natural language processing tasks such as interpreting and generating text or code). The pre-trained LMs 651 may interpret the user queries 612A, . . . , 612N to identify one or more requests included in each request.

Figure 7:
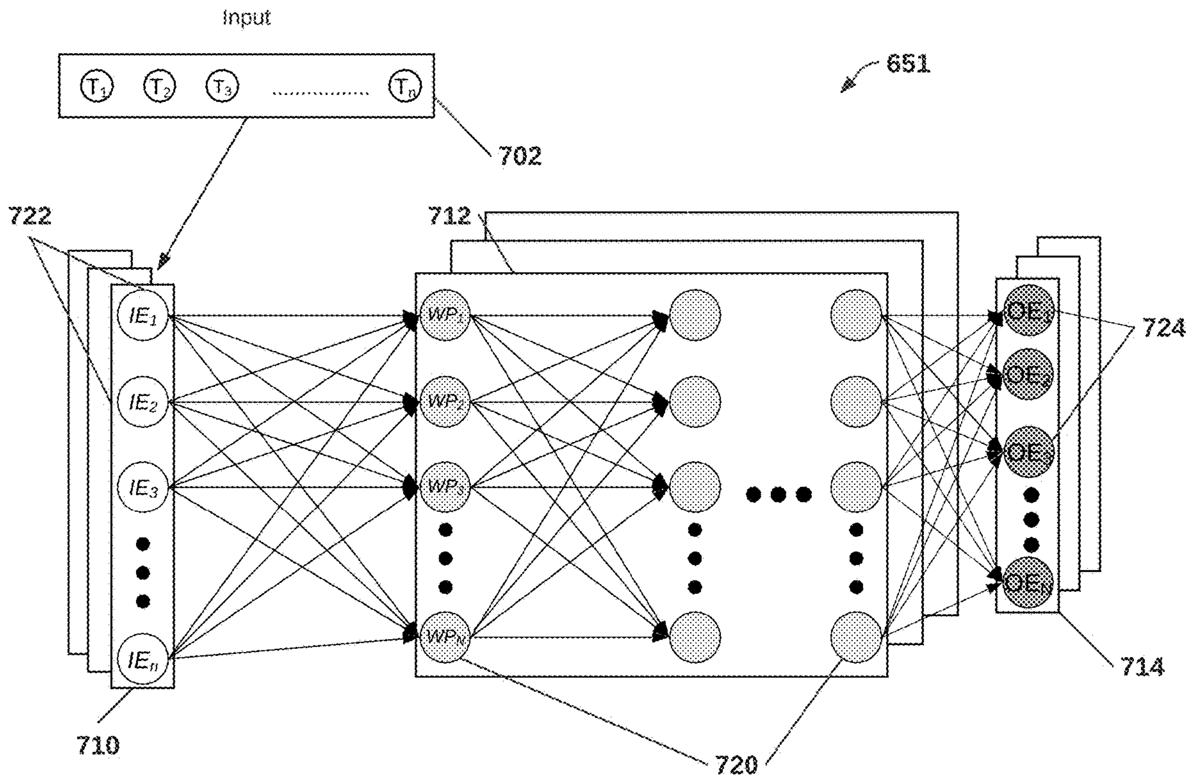
FIG. 7 illustrates an example pre-trained LM, according to various embodiments described herein.

FIG. 7 illustrates a simplified example of a model architecture for the pre-trained LMs 651. In various embodiments, a deep neural network may be used to implement the pre-trained LMs 651. The deep neural network of the pre-trained LMs 651 may include one or more encoder layers 710, multiple hidden layers 712, and one or more decoder layers 714. Each layer may include one or more nodes. In various embodiments the encoder nodes 722 may tokenize the input text into a sequence of tokens (e.g., individual words of sub-words) $T_1, \ldots, T_N$ and calculate input embeddings $IE_1, \ldots, IE_N$ that transform the tokens into numerical representations that may be understood by the pre-trained LMs 651. The input embeddings may map each word in the input text to a mathematical space that places similar words near each other to help the model understand the meaning of the words in the input text 702. The input embeddings may also include a positional embedding that represents the order of the words in the input text 702 in a numerical representation that may be understood by the pre-trained LMs 651.

The encoder layers 710 may also generate multiple hidden layers 712 that capture the meaning and the context of the input text 702. Each of the hidden layers 712 may include multiple hidden layer nodes 720 that calculate parameters $WP_1, \ldots, WP_N$ that store representations of the tokens in the input text at different levels of abstraction. To determine output text from the multiple hidden layers 720, one or more decoder layers 714 may predict a sequence of tokens using the meaning and context stored in the hidden layer nodes 720. To increase the accuracy of the predicted sequence of tokens the pre-trained LMs 651 may include millions or billions of trained parameters included in the hidden layer nodes 720. The training process of the pre-trained LMs 651 may capture meaning and context from huge corpora of text data that include billions of words and sentences.

The decoder layer 714 may contain one or more decoder nodes 724 that generate natural language text based on the input text 702 and the context and meaning learned by the hidden layers 712. The decoder nodes 724 may calculate one or more output embeddings $OE_1, \ldots, OE_N$ that may determine output text by mapping the predicted probabilities determined by the hidden layers 712 to a corresponding token in the vocabulary of the pre-trained LMs 651 (e.g., English, French, Spanish, or other language the LM was trained to understand). The decoder layers 714 may include a linear layer that may map the output embeddings to a higher-dimensional space to transform the output embeddings into the original input space (e.g., the vocabulary of the input text). A softmax function implemented by one or more of the decoder nodes 724 may generate a probability distribution for each output token in the vocabulary to generate output tokens with probabilities. Decoder layer 714 may then select the output token with the greatest probability as the next token in the sequence. The decoder layer 714 may then append the predicted token to the input text 702 and input the updated input text into the model to determine the subsequent next token in the sequence.

During training, pre-trained LMs 651 may learn the context and meaning of words included in the training dataset. To train the deep neural network, the training program initializes the weights of each of the hidden layer node 720 by determining an initial value for the weights of each of the millions or billions of trainable parameters included in the network. The output embeddings implemented in the decoder nodes 724 may compute an error value for a loss function that measures the difference between the predicted sequence of tokens generated by the model and the target sequences in the training dataset. The decoder nodes 724 may also determine a gradient function (e.g., a gradient descent algorithm) that backpropagates the error from the output layer back through the hidden layers 712 and/or decoder layers 714 of the model by calculating a loss gradient for each weight and/or input embedding.

For example, the loss gradients determined by the decoder nodes may be partial derivatives of the loss function with respect to each weight to determine the portion of the error value attributed to each weight in the hidden layers 712 and/or input embedding in the encoder layers 710. The decoder nodes 724 may adjust the weights of the trainable parameters and/or values for the input embeddings in the direction of the negative gradient by multiplying the current value of the weight and/or input embedding by a learning rate (e.g., 0.1 or any other predetermined step size) and subtracting the result from the gradient values to determine the updated weight values and embedding values for each trainable parameter and input embedding respectively. The decoder nodes 724 may determine an updated model by setting the weight for each trainable parameter to the updated weight values and/or setting the value for each input embedding to the update embedding values.

During each training epoch, the trainable parameters and input embeddings of the pre-trained LMs 651 may be re-trained based on the error value for the output text calculated by the decoder nodes 724. For example, an initial version of the pre-trained LMs 651 may determine output text for a training sample including multiple different examples of input text 702. The decoder nodes of the initial versions of the pre-trained LMs 651 may determine an error value for a loss function that measures the difference between the output text predicted by the model and the target text outputs for each example in the training sample. A gradient function implemented in the decoder nodes 724 may backpropagate the error back through the hidden layers 712 by adjusting the weights for each hidden layer node 720 based on the loss gradients for each weight. The gradient function may also backpropagate the error back through the input embeddings in the encoder layer 710 by adjusting each input embedding based on the loss gradient for each embedding. An updated version of the pre-trained LMs 651 including the updated weights and/or input embeddings then be re-trained on a training sample as described above. New iterations of the pre-trained LMs 651 may be determined over multiple training epochs to improve the performance of the LMs until the performance of the pre-trained LMs 651 does not improve with additional training and/or a desired level of performance of the pre-trained LMs is achieved.

Referring back to FIG. 6, the model training service 630 may train the pre-trained LMs 651 to generate agent LMs 652A, . . . , 652N that may perform actions or action chains (i.e., series of actions) that are requested in the user queries 612A, . . . , 612N. The agent LMs 652A, . . . , 652N may be trained to interact with one or more resources 524 in order to perform the actions and/or action chains. Resources 524 may include data sources 622 (e.g., relational databases, unstructured databases, identity graphs, document stores, and the like), software packages 624 (e.g., applications, APIs, scripts, programs, code repositories, code libraries, and the like), content libraries 626 (e.g., repositories of images, videos, audio files, and other content), and models 220 (e.g., machine learning models and LMs that may generate predictions and other data).

To train agent LMs 652A, . . . , 652N to perform one or more actions and/or action chains, the model training service 630 may determine training data for each of the agent LMs 652A, . . . , 652N. The training data may include one or more training prompts 640A, . . . , 640N and a set of test cases 648. The training service 630 may generate unique training data for each agent LM 652A, . . . , 652N to simplify the training process and enable the agent LMs 652A, . . . , 652N to specialize in specific subsets of tasks (e.g., information retrieval, campaign configuration, campaign monitoring and optimization, content generation, and the like). The test training prompts 640A, . . . , 640N generated by the model training service 630 may be specific to each agent LM 652A, . . . , 652N and may include different, agent specific training instructions, resources, and tools. The test cases 648 may also be specific to each agent LM 652A, . . . , 652N and may include a different sets of sample user requests that test the specific functionality of each agent LM and different test responses 649 for the user requests that include the desired outputs for each agent LM.

FIG. 8 illustrates an example training prompt 640A that may train an agent LM 652A to perform specific actions and action chains. The training prompts 640A, . . . , 640N may include request data 520 including one or more user requests, training instructions 642A, one or more tools 644A, and a chain history 646A. The training instructions 642A may train a general purpose, pre-trained LM to operate as an agent LM that performs a particular type of task (e.g., data retrieval, content creation, media campaign configuration, media campaign deployment, campaign performance monitoring, campaign optimization, reporting, error troubleshooting, and the like). The training instructions 642A may include agent instructions that identity what type of agent the agent LM is, the tasks the agent LM can perform, and how to use the tools and resources needed to complete the tasks.

The training instructions 642A may also include resource instructions that train the LM to use one or more resources. The resource instructions may indicate how the agent LM can interact with the resources and describe the functionality of each resource. The resource instructions may also include an input data format (e.g., natural language text, standard file format, and the like) that defines the format of the input data that is compatible with the resource. To interface with the resources, the agent LMs generate completions having the input data format and pass the formatted completions to a tool 644A that interfaces with the resource. The tool 644A may be a wrapper, API wrapper, shell, terminal, script, or other piece of computer code that may interface with the resource to retrieve the information and/or perform the operation requested by the formatted competition. The resource instructions may also include a resource task that describes one or more actions that may be performed using a resource.

The resource instructions may also include task parameters that may configure the interactions between the agent LMs and the resources. For example, the task parameters may include one or more usage guardrails that may limit the number of interactions the agent LMs may have with a resource and/or the amount of compute resources consumed by the resources during interactions with agent LMs. The task parameters may also include resource optimizations that optimize one or more aspects of the resources (e.g., versatility, speed, efficiency, cost, reliability, and the like) for agent LM interactions. The resource optimizations may include, for example, one or more configurations of the agent LMs and/or resources. The resource instructions may also include an output format that identifies a format for output data the agent LM must use when presenting outputs to users. The output format may include instructions for the agent LMs to transform outputs received from the resources into a particular format (e.g., summary, chart, table, ordered list, and like) desired by the user. The resource instructions may also include validation instructions that identify best practices for limiting errors and troubleshooting methods for correcting errors that may arise during interactions between the agent LMs and the resources.

The model training service may determine custom training prompts for each agent LM based on the type of agent and the actions and/or action chains the agent performs. The custom training prompts for each LM agent may include agent specific combinations of resources and/or instructions for interacting with the resources that are unique to each agent LM. For example, to train a search agent LM that performs data retrieval tasks, the model training service may determine training prompts that include resource instructions for interacting with one or more data sources. To train an artist agent LM that generates brand specific content, the model training service may generate training prompts that include resource instructions for interacting with one or more content libraries and/or one or more content editing and/or content creation applications. To train a campaign builder agent, the model training service may generate training prompts that include resource instructions for interacting with one or more artist agent LMs, one or more identity and/or customer databases, and/or one or more content publishing applications. Other aspects of the training instructions including, for example, agent instructions, model tasks, input and/or output data formats, resource tasks, task parameters, and/or validation instructions may also be varied according to the type of agent LM trained, the tasks performed by the agent, and/or the characteristics of the pre-trained LM (e.g., size, amount of parameters, composition of training data, latency time, inference costs, and the like) that is trained as the agent. The model training service may also modify one or more aspects of the training instructions (e.g., agent instructions, model tasks, input and/or output data formats, resource tasks, task parameters, and/or validation instructions) during the agent LM training process based on feedback data determined by a validation service as described in more detail below.

The training prompt 640A may also include one or more tools 644A that may be used by the agent LMs to interact with resources. Tools 644A are interfaces that enable the agent LMs to act with other software components and may be implemented as API wrappers, application wrappers, scripts, functions, code snippets, libraries, or other pieces of computer code. Tool 644A may receive one or more lines of text from an agent LM as input, interact with a resource based on the input to get the information and/or perform the action requested, and return one or more lines of text as output that includes the requested data and/or an action confirmation. Tools 644A may provide agent LMs access to generic utilities, for example, web search, mathematical software packages, application APIs, and the like. Tools 644A may also enable agent LMs to perform actions (e.g., send emails, configure content campaigns, report on campaign performance, and the like) and/or action chains (e.g., draft and send email messages, create creative assets and build content campaigns publishing the created assets, and the like). Tools 644A also enable agent LMs to interface with other LMs, machine learning models, and analytical tools to analyze data, make predictions, make decisions, and/or generate prompts for other LMs.

The training prompt 640A may include a list of tools 644A available to the agent LMs to use to perform one or more actions and/or action chains. For each of the tools 644A, the training prompt 640A may include a tool name, a tool description, and one or more tool parameters. The tool description may identify the type of tool, for example, utility, software package, application, API, API wrapper, a shell or terminal that executes commands written in a computer language (e.g., Python, Node.js, SQL, and the like), LM, machine learning model, and the like. The tool parameters may train the agent LM to use each of the tools 644A. The tool parameters may identify one or more inputs required by the tool to perform an action (e.g., a valid SQL query, an API call including a valid API key, natural language text, an initialized LM, and the like) and identify the data formats (e.g., a Phyton script, a API call, JSON file, YAML file, a SQL query, and the like) that are compatible with the tool. The tool parameters may also identity the data formats (e.g., comma separated values or other ordered lists, arrays, tables, or other data structures, natural language text, and the like) for outputs received by the LM from the tool. The tool parameters may also include one or more tool optimizations that may improve one or more performance aspects of the tool (e.g., reliability, speed, processing efficiency, versatility, interoperability, scalability, and the like) by optimizing the configuration of the agent LM for the tool. For example, the tool optimizations may include a character limit or other size restriction for inputs into the tool, specify one or more LM types that are most compatible with the tool, a time out period, and the like.

The model training service may determine a custom set of tools 644A for each of the training prompts based on the resources included in the training instructions 642A. Different tools 644A are required to interact with different resources so the model training service may select at least one tool 644A of a tool type that is compatible with each of the resources included in the resource instructions. The model training service may also determine the tools 644A to include in the training prompts 640A for different agent LMs based on the type of agent LM and the actions and/or action chains the agent performs. The model training service may determine custom tool selections for each agent that may include agent specific combinations of tools 644A and/or agent specific tool parameters that may optimize one or more configurations of the agent LMa for one or more tools 644A. The model training service may also modify one or more aspects of the tools 644A (e.g. the tools selected, the tool names, the tool descriptions, and/or the tool parameters) during the agent LM training process based on feedback data determined by a validation service as described in more detail below.

The training prompt 640A may also include a chain history 646A comprising a list of actions, prompts, and completions generated by agent LMs. The chain history 646A may also include context details about each action performed including the tool used to perform the action, the resource invoked by the tool, and/or a description of the data retrieved and/or action performed using the resource. The prompts and completions for each action may include one or more agent LM prompts input into a tool, one or more responses received from the tool, and one or more responses generated by the agent LMs. The chain history 646A for an initial prompt in an action chain may be empty and include no historical data. After the agent LM completes an action, the action, context details, prompt, and completion for the action be appended to the chain history 646A. To complete the next action in the action chain, the model training service may determine a new training prompt including the updated chain history 646A. The model training service may select an LM (e.g., a agent LM or pre-trained LM) to complete the next task and pass the new training prompt to the selected LM to train the selected LM to perform the next action. As each action in the action chain is completed the chain history 646A grows so that the LM selected to perform the next action remembers the previously completed actions so that the selected LM is aware of its role in the action chain and does not repeat any previously completed actions. The chain history 646A also provides the selected LM a record of the previously generated completions so that the selected LM may use one or more outputs of a previous action as an input for the prompt of the next action and/or determine the output for the next action based on one or more previously generated outputs.

The chain history 646A allows agent LMs to remember the model thoughts and actions used to complete prior steps in an action chain. LMs selected for the next action in an action chain can review the chain history 646A in the training prompt to determine the required next action in the action chain. The selected LMs can then use the resources and tools in the training prompt to complete the next action. The selected LMs may also parse the chain history 646A to extract outputs from one or more completed actions that may be used in the next action in an action chain. For example, the LMs may embed one or more extracted outputs in a prompt for a tool. The LM may also combine the extracted outputs with one or more other inputs included in a prompt and/or modify one or more aspects of the prompt based on the extracted outputs.

Returning back to FIG. 6, the training service may train multiple agent LMs to perform a data retrieval task. For example, the agent LMs may be trained to search a SQL database to identify a content campaign having the most click events in the past month. The action chain for a click data retrieval task may include action A (e.g., use tool RelevantTableRetrievalQA to determine relevant tables), action B (e.g., use tool TableSchemaLookup to determine the schema for relevant tables), and action C (.g., use tool query_sql_db to extract relevant data from tables). To determine to action chain needed to generate a response for the task and the correct next action for each action chain, the actions engine may use a pre-trained LM 651. The pre-trained LM 651 may parse the user request to identify a task request by a user and determine an action chain that may generate a response for the task. The pre-trained LM 651 may also determine the correct next action in the action chain based on a record of one or more previously completed actions (e.g., previous actions), the outputs generated for each pervious action, and/or the training prompt for each agent LM that generated a response for a previous action. The pre-trained LMs 651 may also identity one or more resources and one or more tools for the next action by parsing a list of available tools and resources. The pre-trained LMs 651 may provide the next action, the identified resources and/or tools, a chain history including one or more previous actions and/or the outputs generated for each pervious action, and/or the training prompts for each agent LM that generated a response for a previous action to the model training service 630 to facilitate training an agent LM 652A, . . . , 652N to complete the next action.

The model training service 630 may also train an agent LM (e.g., a response agent LM) to identity the tasks requested by the user, the action chains required to complete each task, and identify the tools and resources needed for the action. For example, the model training service 630 may train a response agent LM to parse the user request included in the user request 612A. The response agent may determine an action chain for generating a response to the user request (e.g., an action chain that can complete a task included in the user request). The response agent LM may also identify a first action in the action chain (e.g., action A) and the tools and/or resources needed to complete the first action. For example, the request agent LM may determine the first action needed to complete the requested data retrieval task is to determine the location of relevant data (e.g., the location of data about campaigns and clicks). The request agent LM may identify the tools and/or resources needed for the first action by parsing a list of available tools and tool descriptions. For example, the request agent LM may review the available tools and descriptions and determine the RelevantTableRetrievalQA tool may be used to identify the tables that contain the relevant data (e.g., data about campaigns and clicks) for the click data retrieval task data. To complete action A, the model training service 630 may determine a first training prompt for a lookup agent LM that includes the RelevantTableRetrievalQA tool and one/or more database resources storing information about clicks and campaigns. The first training prompt may train the lookup agent LM to use RelevantTableRetrievalQA tool and the database resources. After training, the lookup agent LM may generate and pass a prompt including one or more lines of natural language text (e.g., which tables contain information about campaigns and clicks) to the RelevantTableRetrievalQA tool. In response, the lookup agent LM may receive, from the RelevantTableRetrievalQA tool, an output that includes the relevant tables (e.g., impressions and conversions) identified by the tool from the database resource. The lookup agent LM may generate a response to action A (e.g., a completion) that includes the relevant tables.

The request agent LM may receive the completion from the lookup agent LM and identify the next action in the action chain and the tools and resources needed to complete the action. For example, the request agent LM may identity action B (e.g., retrieving the schema of the relevant tables) as the next action in the action chain and the request agent LM may parse the list of tools and tool descriptions and determine the TableSchemaLookup tool may be used to complete this action. The model training service 630 may train a schema agent LM to complete action B by determining a second training prompt that includes the TableSchemaLookup tool and one or more database resources hosting the relevant impressions and conversions tables. The model training service 630 may also add action A, the prompt for completing action A, the action context details, and the completion generated by action A to the chain history of the second training prompt. The model training service 630 may use the second training prompt to train the schema agent LM.

After training, the schema agent LM may use the chain history, the TableSchemaLookup tool, the database resources to complete action B. For example, the schema agent LM may parse the chain history to identity the names of the tables including relevant data (e.g., impressions, conversions) that were determined in action A. The schema agent LM may generate a prompt for the TableSchemaLookup tool that includes the identified table names and pass the prompt to the tool. In response, the schema agent LM may receive creation statements including the schemas for the impressions and conversions tables from the TableSchemaLookup tool. The schema agent LM may extract the schemas from the creation statements and generate a response for action B (e.g., a completion) that includes the extracted schemas.

The response agent LM may receive the completion from the schema agent LM and identify the next action in the action chain and the tools and resources needed to complete the action. For example, the response agent LM may determine the next action is using the schemas identified in action B to extract campaign click impression data and interpret the extracted data for the user (e.g., action C). The response agent LM may also parse the list of available tools and tool descriptions to determine the query_sql_db tool may be used to complete action C. The model training service 630 may train an analyst agent LM to complete action C by determining a third training prompt that includes the query_sql_db tool and one or more database resources hosting the click impression data for completed campaigns. The model training service 630 may also may add action B, the context details for action B, the prompt for completing action B, and the completion generated by action B to the chain history of the third training prompt. The model training service 630 may use third training prompt to train the analyst agent LM.

After training, the analyst agent LM may use the chain history, the query_sql_db tool, and the database resources to perform action C. For example, the analyst agent LM may extract the schema data for the impressions and conversions tables from the chain history and determine an SQL query that extracts the number of clicks per campaign from the tables identified schema data that include that information. The SQL query may also specify an order for the data retrieved by the query. The resource instructions included in the third training prompt may train the analyst agent LM to compose queries in SQL language. The analyst agent LM may generate a prompt that includes the generated SQL query and pass the prompt to the query_sql_db tool. In response, the analyst agent LM may receive a list of campaign ids and the corresponding number of clicks obtained for each campaign over for the most recent 30 day period. The analyst agent LM may organize the data received from the query_sql_db tool into two columns of data that include a first column listing the top k campaign ids ranked by the number of clicks for each campaign that appear in the second column.

The analyst agent LM may interpret the campaign and click data and select the campaign ID with the greatest number of clicks. The analyst agent LM may generate a completion that returns the top campaign ID and the number of clicks for the campaign over the previous month to the user as a response to the user request 612A. For example, the response generated by the analyst agent LM may be displayed in a conversational UI, performance monitoring UI, and/or other UI included in the publishing engine.

The response for the first action chain generated by the analyst agent LM may also be included in an initial training prompt for a second action chain that may use and/or manipulate the final response and/or one or more intermediate outputs (e.g., the outputs received from tools and/or responses generated for actions A and/or B) retrieved by the first action. For example, the top campaign identified by the analyst agent LM may be provided to a second action chain that generates a plot displaying the top k campaigns having the most clicks per month over the past year. The model training service 630 may train additional agent LMs to complete the second action chain using additional training prompts that include training instructions, tools, resources, and/or request data for each action in the second action chain. For example, the additional training prompts may train one or more additional agent LMs to use one or more tools and/or resources to build reports including charts and other visualizations. The reports and/or charts determined by the additional agent LMs may be displayed alongside the raw data retrieved from the first action chain in one or more UIs (e.g., a conversational UI, a performance monitoring UI, campaign optimization UI, and the like).

In various embodiments, after the final action in an action chain is completed, the actions engine 230 may provide the response determined by an agent LM 652A, . . . , 652N to a publishing engine 680 or other application that may display the determined response in one or more UIs (e.g., conversational UI, performance monitoring UI, campaign configuration UI, and the like). The responses determined by the agent LMs 652A, . . . , 652N may also be provided to one or more other agent LMs 652A, . . . , 652N that may use the determined response in another action chain (e.g., a second action chain the builds graphs and reports for displaying data retrieved by a first action chain). A validation component 240 may review the responses determined by the agent LMs 652A, . . . , 652N to verify the format of the response matches the format requested by the user. The validation component 240 may also review the agent responses to verify the format of the response may be displayed in a particular UI and/or interpreted by other agent LMs that are using the response in additional action chains. The validation component 240 may also review the content of the responses to verify the agent LMs 652A, . . . , 652N are performing according to their programming and not generating responses that may be harmful and/or nonresponsive to user requests.

Figure 9:
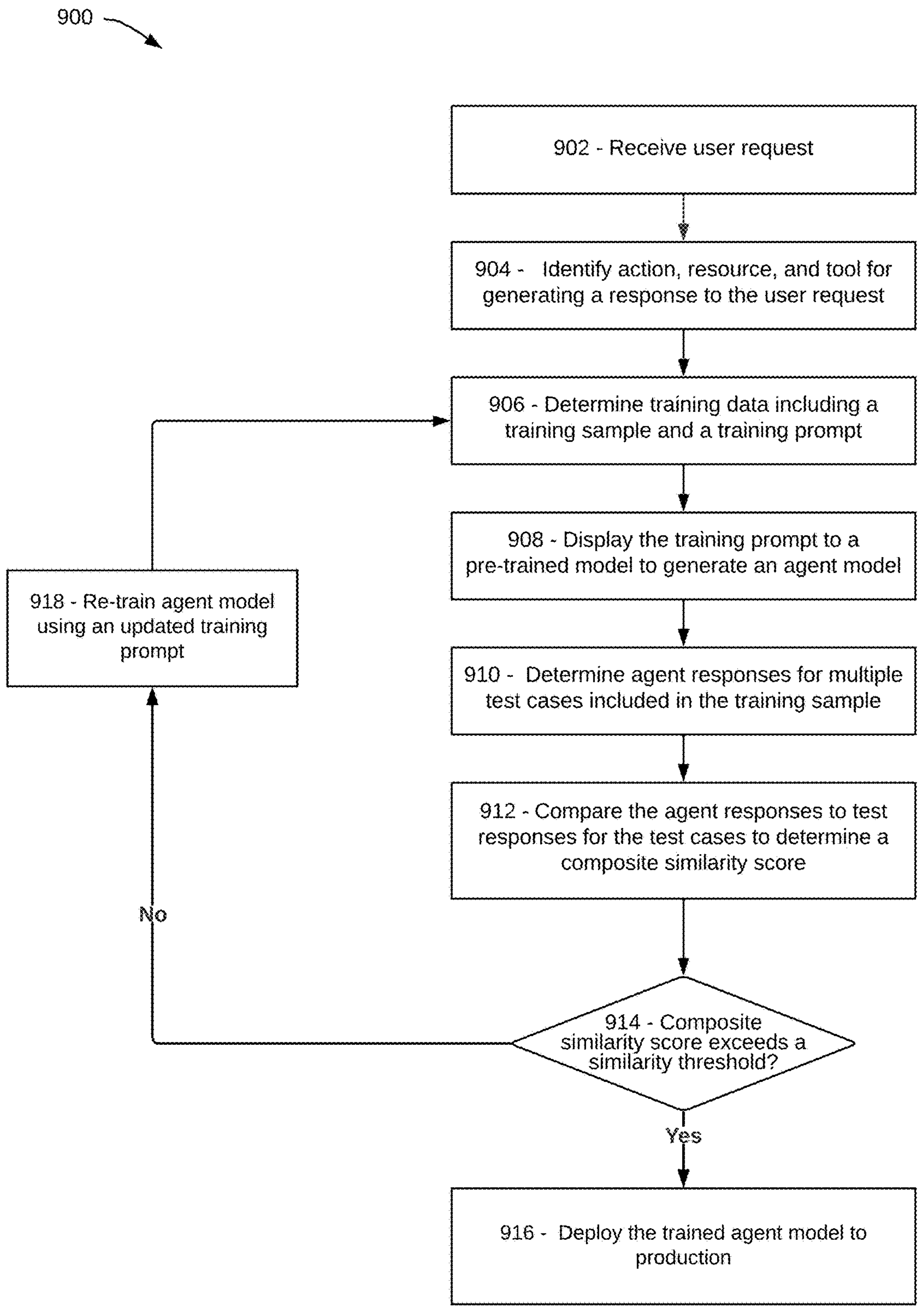
FIG. 9 is a flow chart depicting operations in a method for training an agent LM, according to an example embodiment.

Some present examples also include methods. FIG. 9 is a block diagram of a process 900 for training an agent model (e.g., an agent LM) to generate responses to actions. The trained agent model may generate responses to actions that are included in action chains used to generate responses to user requests. At step 902, the actions engine may receive a user request from, for example, a conversational UI. At step 904, a pre-trained model (e.g., a pre-trained LM) or an agent model may identify an action, one or more resources, and one or more tools for generating a response to the user request. The pre-trained model and/or agent model may identify a task included in the user request and an action chain that can determine a response for the task (e.g., a response that completes the task). The pre-trained model and/or agent model may also identify a first action in the action chain and one or more resources and one or more tools needed to perform the first action.

At step 906, a model training service may determine training data for training an agent model to generate a response for the action chain and/or first action in the action chain. The training data may include a training sample and a training prompt. The training sample may include multiple test cases that each include a sample user request and a test response. The sample user requests in the test cases include tasks for the agent model to perform that are similar to the tasks included in the user request. For example, the tasks included in the sample user requests may require the same actions and/or action chains as the tasks included in the user request. The test responses each include one or more correct response for the tasks included in the sample user requests and may be generated manually and or using a supervised generative AI system to ensure the correct responses meet a desired level of accuracy and quality.

The training prompts may include the user request, training instructions, and one or more configurations for the identified tools and/or resources. In various embodiments, the configurations for the identified tools may be included in a set of tool instructions. The tool configurations may include, for example, one or more identified tools, a description of each tool, and one or more tool parameters for each tool. In various embodiments, the configurations for the identified resources may be included in a set of resource instructions. The resource configurations may include for example, one or more identified resources, input data formats, resource tasks, task parameters, output formats, and validation instructions. In various embodiments, one or more of the tool and/or resource configurations may be optimized during the agent LM training process to improve the performance of the agent LM. For example, one or more tools and/or resources may be added to the training prompt in order to increase the accuracy of the responses generated by an agent LM. One or more tool parameters and/or resource task parameters may be modified to reduce the inference costs and/or latency associated with calls made to tools by the agent LMs. One or more resource input data formats and/or output formats may be modified to enable tools to get faster outputs from resources, and the like. The training prompt may also include a chain history for one or more completed action chains. The chain history may include an action in the completed action chain, a prompt for performing the action, and a response generated for the action. The response may include, for example, one or more outputs obtained from one or more tools and/or resources that were used for the action.

At step 908, the model training service may display the training prompt to a pre-trained model to generate an agent model. At step 910, the model training service may use the agent model to determine agent responses for multiple test cases included in the training sample. At step 912, a validation service may compare to the agent responses to the test responses for each of the multiple test cases. The validation service may generate a similarity score for each test case the measures a degree of similarity between the agent response and the test request for the test case. The validation service may generate the similarity score using an LM or other language model (e.g., an evaluation agent) that generates a similarity score (e.g., a score between 0-100) in response to a user request. The validation service may also generate the similarity score using a semantic similarity algorithm (e.g., WordNet-Based Similarity, Word Mover's Distance (WMD), Cosine Similarity, Jaccard Index, and the like). The validation service may also generate the similarity score using a logistic regression, deep neural network, or other machine learning model that compares encoded representations of the agent and test responses, classifies their similarity, and determines a similarity score measuring the degree of similarity.

The similarity scores for each of the test cases may be combined to generate a composite similarity score for the agent LM across all of the test cases in the training sample. For example, the similarity scores may be averaged to determine a composite similarity score. The composite similarity scores may also be determined using a weighted average that multiples scores for test cases deemed to be more or less important and/or influential by larger or small weights, respectively, before averaging all of the weighted scores to calculate the composite score. The composite score may be compared to a similarity threshold (e.g., 88 or some other predetermined score). At step 914, if the composite similarity score satisfies (e.g., meets or exceeds) a similarity threshold (Yes at step 914), the trained agent model may be deployed to production, at step 916. For example, the trained agent model may be deployed to a version of the publishing system implemented in a production environment.

If, at step 914, the composite similarity score does not exceed the similarity threshold (No at step 914), the trained agent model may be retrained at step 918. To re-train the agent model, the model training service may update the training prompt based on the composite similarity score and/or the similarity score for one or more test cases. The model training service may update the training prompt by adding and/or removing one or more tools and/or resources from the training prompt. For example, the model training service may add a new database source to a training prompt and/or change the interface for a resource to a new tool to improve the accuracy of the responses generated by the agent model.

The model training service may also update the training prompt by optimizing one or more configurable aspects of the tool instructions and/or resource instructions (e.g., the tool configurations and resource configurations respectively). The model training service may also optimize one or more configurations of the LM selected for the agent model. The model training service may optimize one or more of the tool configurations, resource configurations, and LM configuration to improve the performance of the agent LM both in terms of technical performance (e.g., speed, latency, reliability, cost, compute, and the like) and response quality (e.g., response accuracy, relevance, and the like). The optimal configurations for the tools, resources, and LMs may be determined using machine learning. For example, the model training service may train an optimization model using training data comprising sets of tool, resource, and LM configurations and known performance metrics for each configuration. The training data may also include different sets of configurations used for different agent types, actions, action chains, tools, and/or resources. For example, training data may include different sets of configurations for agent models that generate responses for data retrieval action chains and different sets of configurations for agent models that generate responses for creative asset generation action chains. The training service may fit the optimization model to the training data to generate a trained optimization model that may receive an input set of configurations for an agent LM and/or training prompt and generate an output of predicted optimized configurations. For example, the optimization model may determine optimized configurations for an agent LM that improves the alignment of the agent LM with the tools and/resources needed to complete an action and/or action chain. The optimization model may also determine optimized configuration for a tool and/or resource that improves the alignment between a particular tool and resource. The optimized model configurations determined by the optimization model may be used to configure the LM for the agent model during the re-training process at 918. The optimized tool and/or resource configurations may be included in the updated training prompt. The agent LM may be re-trained using the updated training prompt so that the agent responses from the agent LM configured with the optimized configurations may be evaluated against the test responses. Optimized configurations that generate agent responses having composite similarity scores above the similarity threshold may be stored and maintained as the configurations used by the agent LMs. Optimized configurations that generate agent responses having compositive similarity scores below the similarity threshold may be updated using the optimization model and the updated configurations may be retested on the training sample. The optimization model may be used to iteratively update the LM, tool, and/or resource configurations until the composite similar scores do not improve and/or the composite similarity scores exceed the similarity threshold.

Once the agent model has been re-trained, steps 906-914 may be repeated to determine if the composite similarity score exceeds a similarity threshold. Agent models generating responses with similarity scores exceeding the similarity threshold may be deployed to production and generate response for tasks included in new user requests. The responses generate by the re-trained model may be displayed in, for example, a conversational UI included in the publishing system. Re-trained agent models that generate response with similarity scores that do not exceed the similarity threshold may be retrained by repeating steps 918 and 906-914.

Figure 10:
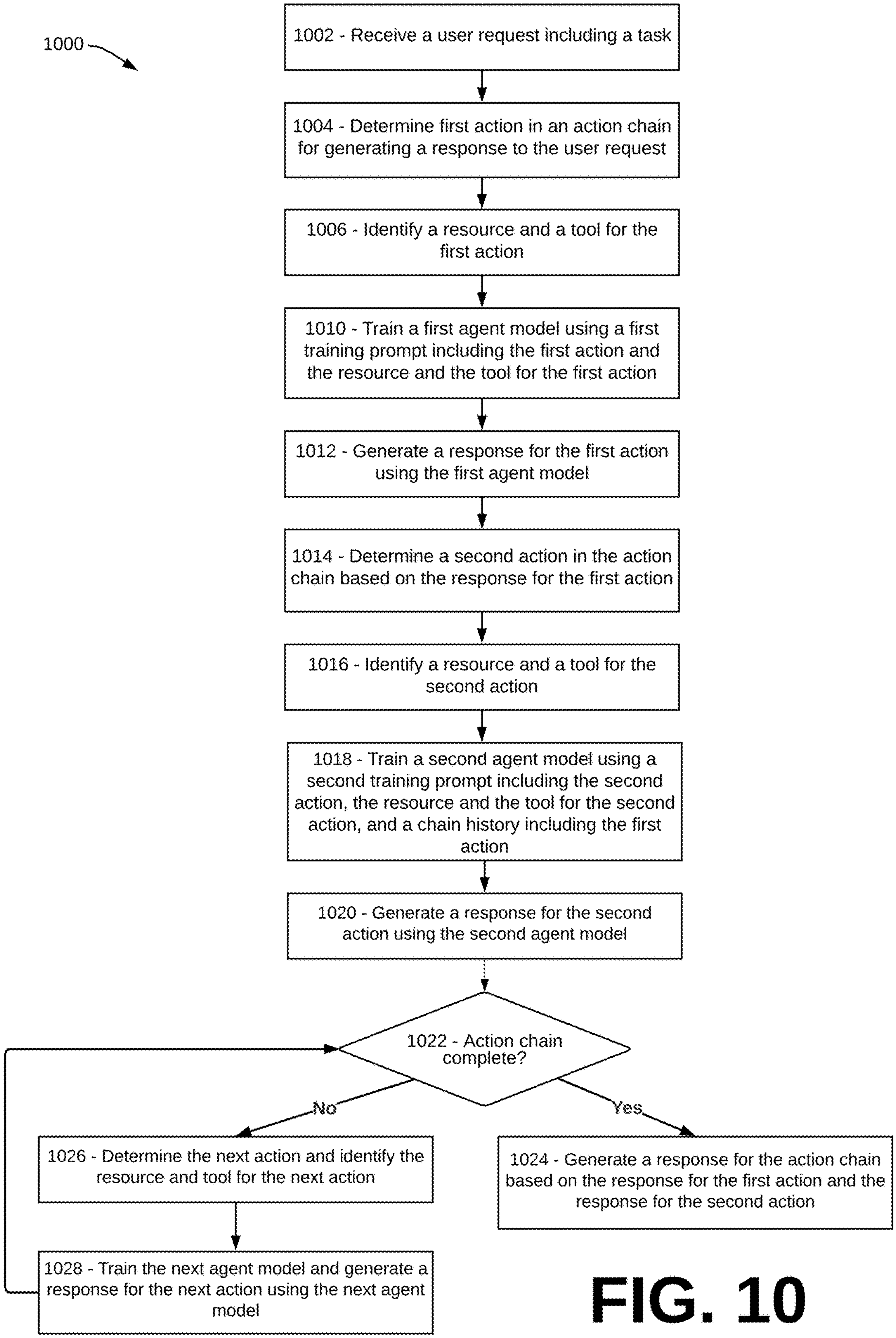
FIG. 10 is a flow chart depicting operations in a method for using a trained agent LM, according to an example embodiment.

FIG. 10 is a block diagram of a process 1000 for using agent models to generate response to user requests to complete action chains. At step 1002, the actions engine receives a user request including a task. For example, the actions engine may receive a user request from a conversational UI of the publishing system. At step 1004, an LM (e.g, a pre-trained LM or agent LM) may determine a first action in an action chain for generating a response to the user request. For example, the actions engine may display the user request to the LM and the LM may generate a response identifying the task included in the user request and an action chain required to generate a response for the task. The LM may also identify the first action tin the identified action chain.

At step 1006, the LM may identify a resource and a tool for the first action. The tool may provide an interface of interacting with the resource and the tool and/or resource may be used to generate an output required to generate a response for the first action. At step 1010, the model training service may train a first agent model using a first training prompt that may include the identified first action and the resource and the tool for the first action. At step 1012, the first agent model may generate a response for the first action.

The first action may be recorded in a chain history and the response for the first action and/or first training prompt may be provided to the LM. At step 1014, the LM may determine the second action in the action chain based on the response for the first action, the user request, the first training prompt, and/or the chain history. At step 1016, the LM may identify a resource and a tool for the second action. At step 1018, the model training service may use a second training prompt to train a second agent model. The second training prompt may include the determined second action, the resource and the tool for the second action, and a chain history including the first action. The second training prompt may also include new training instructions and/or one or more configurations for at least one new resource and/or at least one new tool. At step 1020, the second agent model may generate a response for the second action.

The LM may determine if the action chain is complete. If, at step 1022, the LM determines the action chain is complete (Yes at step 1024), the second agent model and/or LM may generate a response for the action chain based on the response for the first action and the response for the second action. If, at step 1022, the LM determines the action chain is not complete (No at step 1022), the LM may determine the next action in the action chain and identity the resource and tool for the next action, at step 1026. At step 1028, the model training service may train the next agent model and use the agent model to generate a response for the next action. The LM may determine if the action chain is complete again at step 1022. If yes at step 1022, the LM and/or next agent LM may generate the response for the action chain and return the response to the user. If no at step 1022, steps 1026-1028 and 1022 may be repeated until the action chain is completed and the response is returned to the user.

In this disclosure, the following definitions may apply in context. A "Client Device" or "Electronic Device" refers to any machine that interfaces to a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronic system, game console, set-top box, or any other communication device that a user may use to access a network.

"Communications Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" (also referred to as a "module") refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component includes a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:

one or more processors; and a memory storing instructions that, when executed by at least one processor in the one or more processors, cause the at least one processor to perform operations comprising:

identifying a task included in a user request received from a conversational user interface (UI);

determining an action chain for generating a response for the task;

identifying, for the action chain, at least one resource and at least one tool that provides an interface for the least one resource; and training an agent model to generate a response for the action chain, the response being generated using an output from the at least one resource obtained using the at least one tool, the training including:

determining training data including a training sample and a training prompt, the training prompt including the user request, training instructions, and one or more configurations for at least one of the at least one resource and the at least one tool, the training instructions including an instruction that specifies one or more tasks the agent model is configured to perform and an instruction for using the at least one tool to access the at least one resource to complete the one or more tasks;

displaying the training prompt to a pre-trained model to generate the agent model;

generating, by the agent model, agent responses for multiple test cases included in the training sample, each of the multiple test cases including a sample user request and a test response for the sample user request;

comparing the agent response to the test response for each of the multiple test cases to generate a composite similarity score for the agent responses;

updating the training prompt based on the composite similarity score; and re-training the agent model using the updated training prompt.

2. The system of claim 1, wherein the training instructions include resource instructions comprising one or more configurable aspects including resources, input data formats, resource tasks, task parameters, output formats, and validation instructions.

3. The system of claim 1, wherein the training instructions include tool instructions comprising one or more configurable aspects including tools, tool descriptions, and tool parameters.

4. The system of claim 1, wherein the training prompt includes a chain history for a completed action chain, the chain history including an action in the completed action chain, a prompt for generating a response for the action, and a completion including the response for the action.

5. The system of claim 1, wherein the operations comprise determining a value for the composite similarity score that is below a similarity threshold; and using machine learning to optimize a configuration of at least one of the agent model, the at least one tool, and the at least one resource.

6. The system of claim 1, wherein the operations comprise determining a value for the composite similarity score that satisfies a similarity threshold; and deploying the agent model to a production environment.

7. The system of claim 2, wherein the updating the training prompt comprises modifying at least one of the one or more configurable aspects of the resource instructions.

8. The system of claim 3, wherein the updating the training prompt comprises modifying at least one of the one or more configurable aspects of the tool instructions.

9. The system of claim 1, wherein the operations comprise generating, with the re-trained agent model, the response for the action; and displaying the response in the conversational UI.

10. The system of claim 1, wherein the operations comprise generating, with the re-trained agent model, a response for a first action in the action chain;

generating a second training prompt including the user request, new training instructions, one or more configurations for at least one new resource and at least one new tool, and a chain history including a record of the first action;

training a second agent model using the second training prompt; and generating, with the second agent model, a response for a second action in the action chain.

11. A method comprising:

identifying a task included in a user request received from a conversational user interface (UI);

determining an action chain for generating a response for the task;

identifying, for the action chain, at least one resource and at least one tool that provides an interface for the least one resource; and training an agent model to generate a response for the action chain, the response being generated using an output from the at least one resource obtained using the at least one tool, the training including:

determining training data including a training sample and a training prompt, the training prompt including the user request, training instructions, and one or more configurations for at least one of the at least one resource and the at least one tool, the training instructions including an instruction that specifies one or more tasks the agent model is configured to perform and an instruction for using the at least one tool to access the at least one resource to complete the one or more tasks;

displaying the training prompt to a pre-trained model to generate the agent model;

generating, by the agent model, agent responses for multiple test cases included in the training sample, each of the multiple test cases including a sample user request and a test response for the sample user request;

comparing the agent response to the test response for each of the multiple test cases to generate a composite similarity score for the agent responses;

updating the training prompt based on the composite similarity score; and re-training the agent model using the updated training prompt.

12. The method of claim 11, wherein the training instructions include resource instructions comprising one or more configurable aspects including resources, input data formats, resource tasks, task parameters, output formats, and validation instructions.

13. The method of claim 11, wherein the training instructions include tool instructions comprising one or more configurable aspects including tools, tool descriptions, and tool parameters.

14. The method of claim 11, wherein the training prompt includes a chain history for a completed action chain, the chain history including an action in the completed action chain, a prompt for generating a response for the action, and a completion including the response for the action.

15. The method of claim 11, further comprising determining a value for the composite similarity score that is below a similarity threshold; and using machine learning to optimize a configuration of at least one of the agent model, the at least one tool, and the at least one resource.

16. The method of claim 11, further comprising determining a value for the composite similarity score that satisfies a similarity threshold; and deploying the agent model to a production environment.

17. The method of claim 12, wherein the updating the training prompt comprises modifying at least one of the one or more configurable aspects of the resource instructions.

18. The method of claim 13, wherein the updating the training prompt comprises modifying at least one of the one or more configurable aspects of the tool instructions.

19. The method of claim 11, further comprising generating, with the re-trained agent model, the response for the action; and displaying the response in the conversational UI.

20. The method of claim 11, further comprising generating, with the re-trained agent model, a response for a first action in the action chain;

generating a second training prompt including the user request, new training instructions, one or more configurations for at least one new resource and at least one new tool, and a chain history including a record of the first action;

training a second agent model using the second training prompt; and generating, with the second agent model, a response for a second action in the action chain.

* * * * *